(12) United States Patent
Goujard et al.

(10) Patent No.: US 12,491,560 B2
(45) Date of Patent: Dec. 9, 2025

(54) HOLDING TOOLS FOR PREFORM SINTERING

(71) Applicant: SAFRAN CERAMICS, Le Haillan (FR)

(72) Inventors: Stéphane Roger André Goujard, Moissy-Cramayel (FR); Lucas Mathoux-Heuls, Moissy-Cramayel (FR); Thierry Guy Xavier Tesson, Moissy-Cramayel (FR); Christophe Paul Aupetit, Moissy-Cramayel (FR); Emilie Lesizza, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/996,648

(22) PCT Filed: Jul. 17, 2023

(86) PCT No.: PCT/FR2023/051096
§ 371 (c)(1),
(2) Date: Jan. 17, 2025

(87) PCT Pub. No.: WO2024/018143
PCT Pub. Date: Jan. 25, 2024

(65) Prior Publication Data
US 2025/0256331 A1    Aug. 14, 2025

(30) Foreign Application Priority Data
Jul. 22, 2022 (FR) ...................................... 2207570

(51) Int. Cl.
*B22F 3/00* (2021.01)
*B22F 3/10* (2006.01)
(Continued)

(52) U.S. Cl.
CPC .............. *B22F 3/003* (2013.01); *B22F 3/114* (2013.01); *B22F 7/002* (2013.01); *B22F 2003/1042* (2013.01)

(58) Field of Classification Search
CPC .......... B22F 3/003; B22F 3/114; B22F 7/002; B22F 2003/1042
See application file for complete search history.

(56) References Cited

U.S. PATENT DOCUMENTS 2,975,499 A      3/1961  Lapp
2017/0334791 A1  11/2017  Podgorski et al.
(Continued)

FOREIGN PATENT DOCUMENTS

| CN | 105546997 A | * | 5/2016 | ............. F27D 5/005 |
| CN | 107764069 A |   | 3/2018 | |
| CN | 111072379 A |   | 4/2020 | |

OTHER PUBLICATIONS

Written Opinoin of the International Searching Authority as issued in International Patent Application No. PCT/FR2023/051096, dated Nov. 22, 2023.
(Continued)

*Primary Examiner* — Ricardo D Morales
(74) *Attorney, Agent, or Firm* — Pillsbury Winthrop Shaw Pittman LLP

(57) ABSTRACT

An installation for sintering a preform includes a sintering furnace in which a load is disposed, wherein the load includes a revolution preform disposed around at least one holding tool, the at least one holding tool including a disk and a crown present on the periphery of the disk, the crown being made of compressible material capable of being eliminated by thermal oxidation, a portion of the preform being in contact with the crown before sintering.

9 Claims, 6 Drawing Sheets

(51) Int. Cl.
*B22F 3/11* (2006.01)
*B22F 7/00* (2006.01)

(56) References Cited

U.S. PATENT DOCUMENTS

2019/0134848 A1 5/2019 Podgorski et al.
2021/0046671 A1 2/2021 Philippe et al.

OTHER PUBLICATIONS

International Search Report as issued in International Patent Application No. PCT/FR2023/051096, dated Nov. 22, 2023.

* cited by examiner

[Fig. 1]
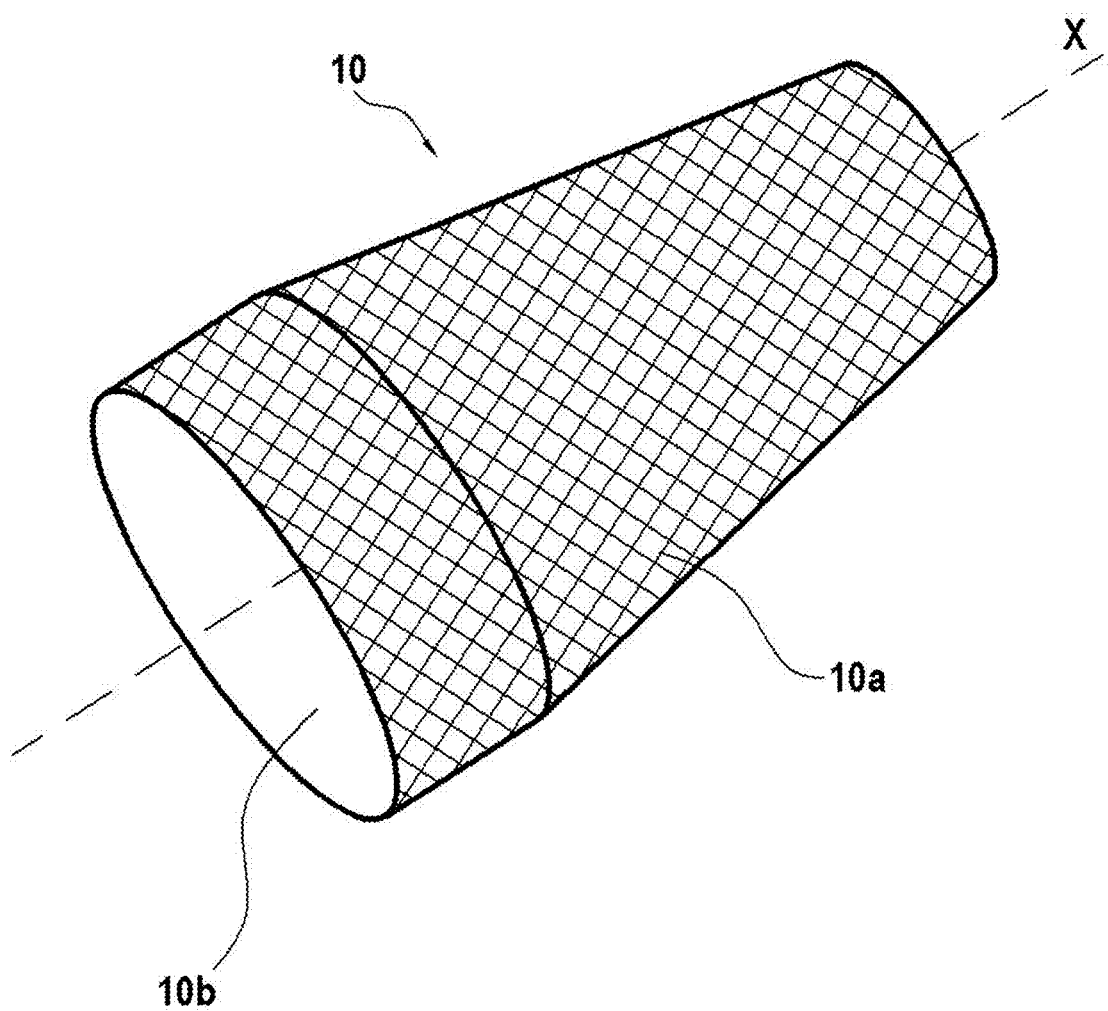

[Fig.2]
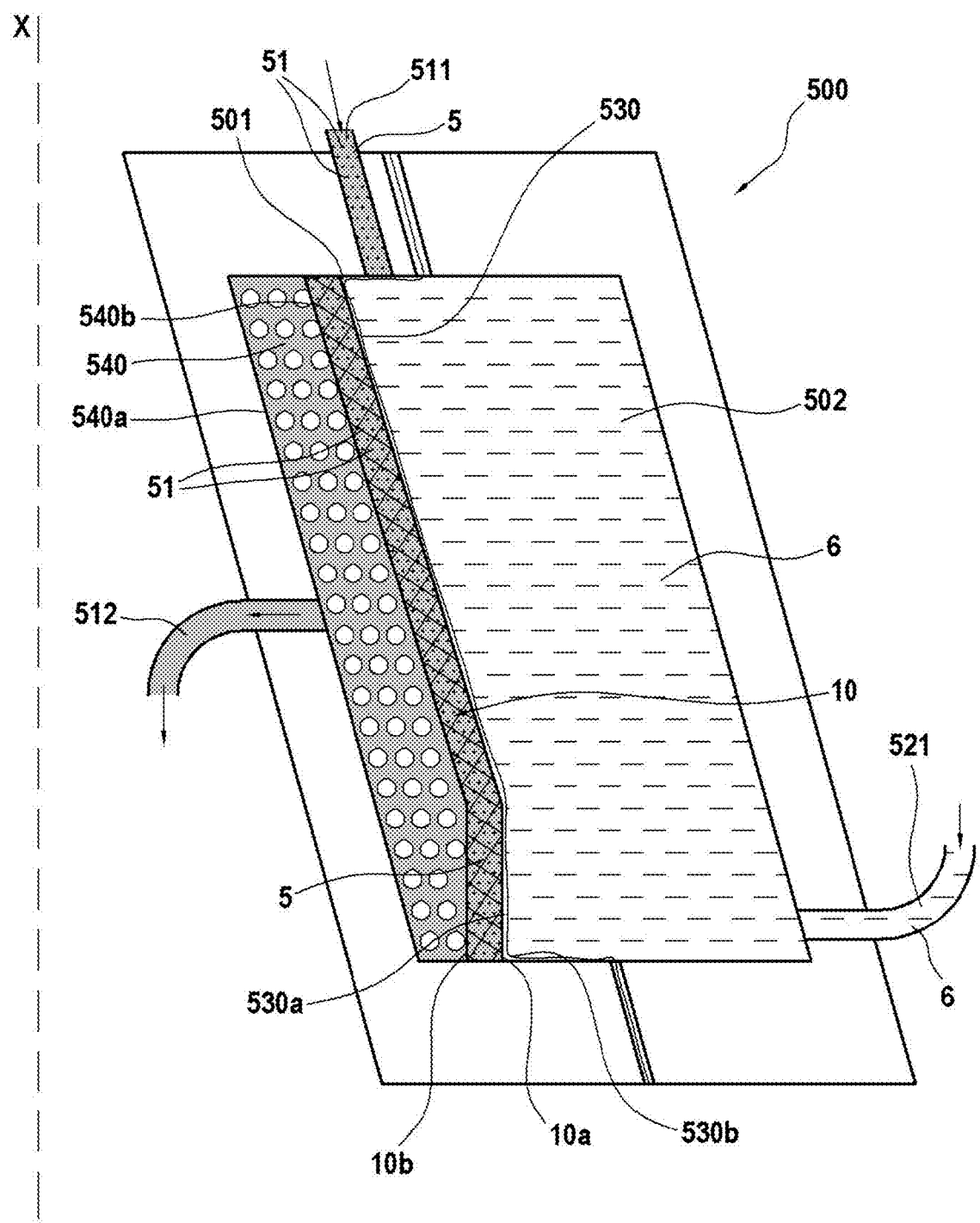

[Fig.3]
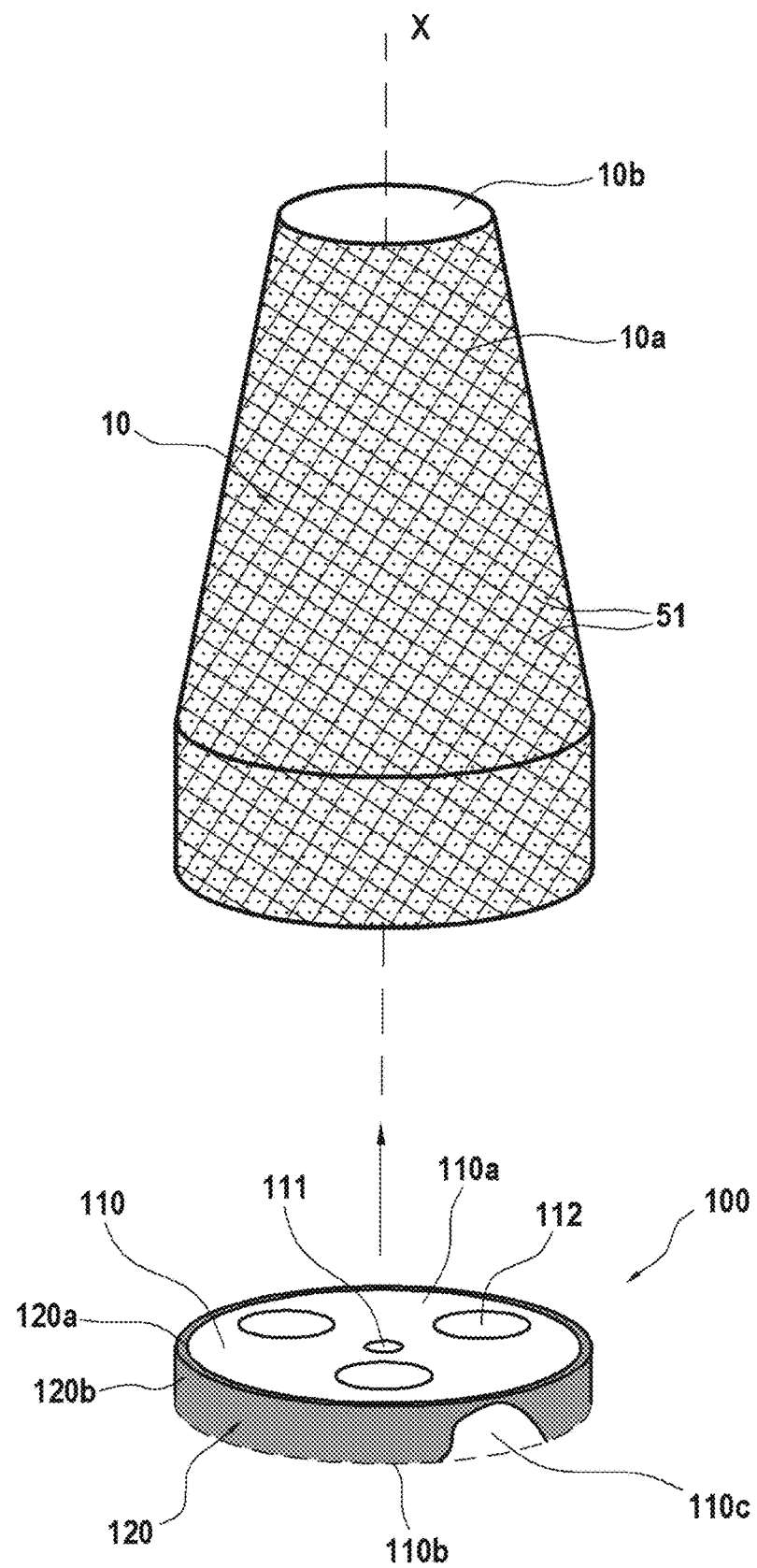

[Fig.4]
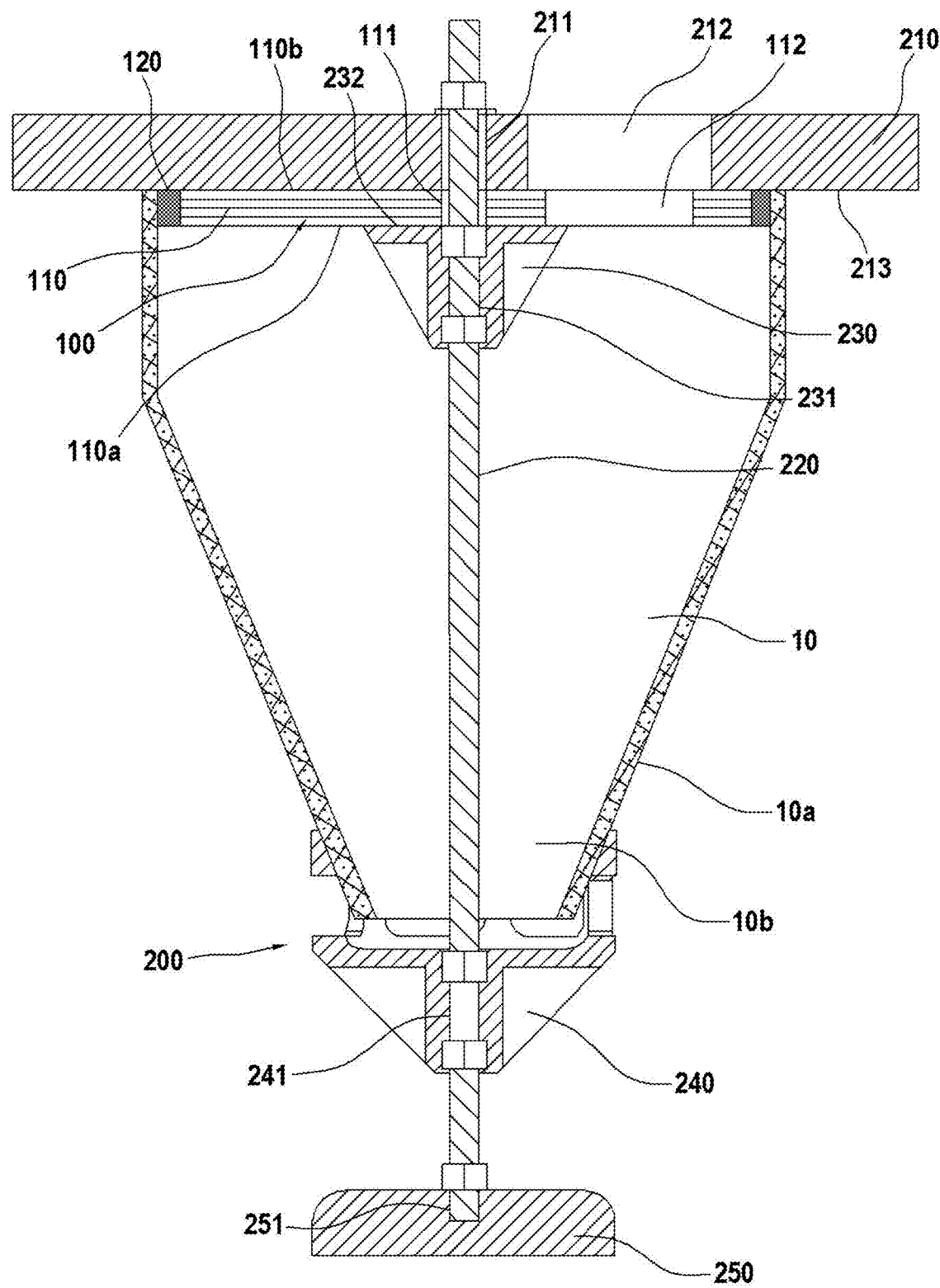

[Fig.5]
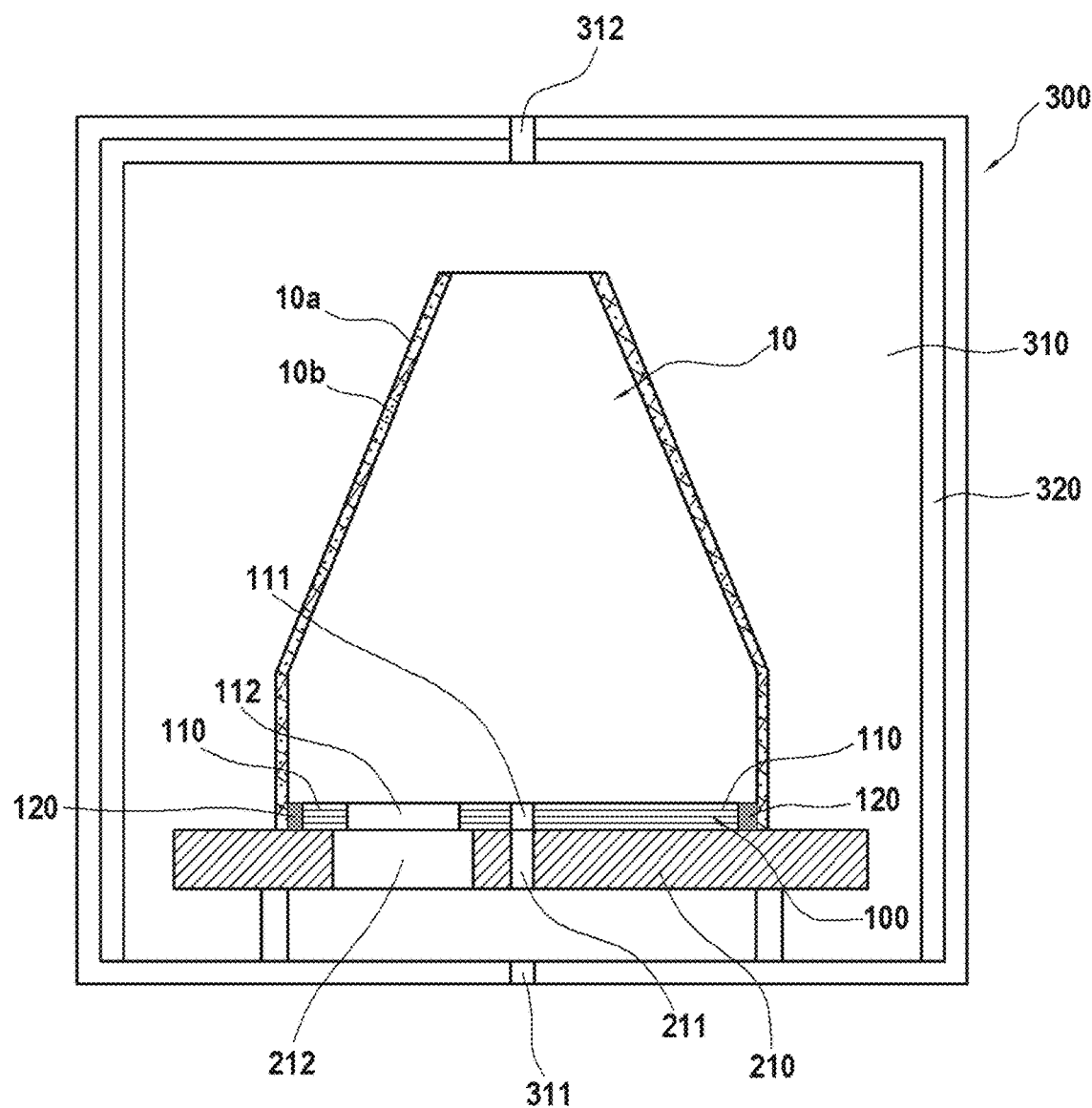

[Fig.6]
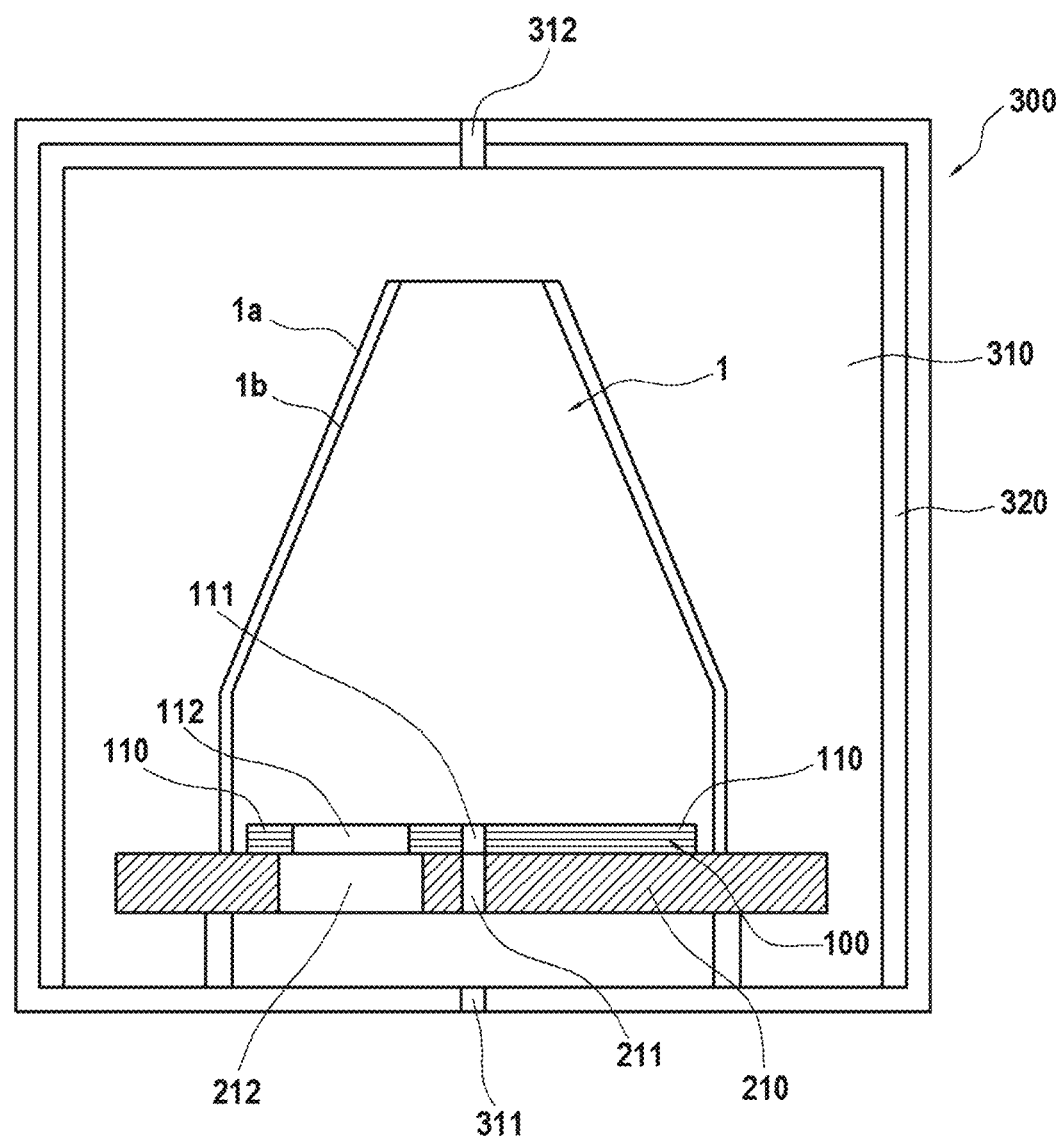

HOLDING TOOLS FOR PREFORM SINTERING

CROSS-REFERENCE TO RELATED APPLICATIONS

This application is the U.S. National Stage of PCT/FR2023/051096, filed Jul. 17, 2023, which in turn claims priority to French patent application number 22 07570 filed Jul. 22, 2022. The content of these applications are incorporated herein by reference in their entireties.

TECHNICAL FIELD

The present invention relates to the production of revolution parts made of composite material, in particular of the oxide/oxide type, and, more particularly, to the maintenance of the fibrous preforms intended to form such parts during high-temperature treatments implemented in particular during debinding or sintering steps. In particular, the present invention relates to the production of parts intended to constitute all or part of the rear-body parts of civil aeronautical engines such as exhaust cones.

PRIOR ART

For the manufacture of composite material parts, in particular of the oxide/oxide type, it is known to produce a fibrous preform, to impregnate it with one or more matrix precursors then to carry out a sintering operation to densify said fibrous preform. The impregnation of the fibrous preform can be carried out in a well-known manner by placing the fibrous preform in a mold and injecting a slurry comprising a liquid phase loaded with matrix precursor particles into said preform. A filter disposed in the mold allows to evacuate the liquid phase of the slurry while retaining the matrix precursor particles in the preform. Such a method is described in particular in documents US2017334791A1 and US2021046671A1. Then, the matrix precursor particles present in the fibrous preform are sintered in order to form the matrix in the porosities of said preform.

An organic binder, for example PVA, can be added to the liquid phase of the slip to ensure the impregnated preform holds after drying and before sintering.

However, it is noted that the preforms thus impregnated can deform during the high-temperature treatments required for the debinding or sintering operations. Indeed, since the matrix precursor particles are not bound inside the preform and the matrix is not yet formed, the impregnated preform has very reduced strength and can in particular become oval. The risk of deformation is even more marked in the case of parts with a very thin thickness and/or a slender shape.

To overcome these unwanted deformations, it has been considered to integrate stiffeners into the parts, or to thicken the portions of the parts most exposed to the risk of deformation. However, these methods have many disadvantages, and in particular cause an undesirable increase in the mass of the parts.

DISCLOSURE OF THE INVENTION

In order to overcome the aforementioned disadvantages, the invention proposes an installation for sintering a revolution preform comprising a sintering furnace in which a load is disposed, the installation being characterized in that the load comprises a revolution preform disposed around at least one holding tool, the holding tool(s) comprising a disk and a crown present on the periphery of the disk, the crown being made of compressible material capable of being eliminated by thermal oxidation, a portion of the preform being in contact with the crown before sintering.

Such an installation ensures that the shape of the fiber preform is maintained during the sintering and possibly debinding steps, without requiring an increase in the mass of the final part obtained. The presence of a layer of compressible material between the disk and the preform allows to compensate for radial thermal expansions between said disk and said preform, to ensure contact between the holding tool and the preform when the latter is not self-supporting or when the latter has reduced strength, in particular before the start of sintering.

"Material capable of being eliminated by thermal oxidation" means here a material the majority of the volume of which decomposes by oxidation when exposed to high temperatures. Thus, the crown made of such a material is capable of holding the fiber preform during a possible debinding operation and preferably until the start of sintering, then can sufficiently decompose by oxidation to allow a clearance to be created between the part obtained by sintering and the holding tool oxidized on its edges. The part obtained can therefore be easily separated from the holding tool after the sintering step. Furthermore, when the part cools after the sintering operation and therefore sees its diameter decrease by thermal shrinkage, the disappearance of the majority of the crown by oxidation allows to avoid contact between the cooled part and the oxidized holding tool, which further limits the risks of damaging the part.

According to one embodiment of the invention, the compressible material is expanded graphite.

Expanded graphite is a particularly compressible material and is able to absorb significant differences in thermal expansion. Furthermore, expanded graphite has oxidation properties that are particularly suitable for a sintering furnace atmosphere. Indeed, in the non-inert and oxidizing atmosphere of a sintering furnace, expanded graphite does not oxidize significantly in temperature ranges that are too low to allow sintering, and oxidizes rapidly in temperature ranges that are high enough to allow sintering.

According to another embodiment of the invention, the disk is made of monolithic ceramic.

The disk is therefore easy to manufacture while having a coefficient of thermal expansion close to the coefficient of thermal expansion of the preform. Indeed, a monolithic ceramic disk is less expensive and time-consuming to manufacture than a disk made of ceramic matrix composite material.

According to another embodiment of the invention, at least one holding tool is disposed at one end of the preform along its axis of revolution.

According to another embodiment of the invention, the revolution preform comprises matrix precursor particles in its porosities.

The invention further relates to a method for manufacturing a composite material revolution part comprising the following steps:
  impregnating a fibrous preform of revolution at least by matrix precursor particles,
  placing the fibrous preform of revolution comprising the matrix precursor particles around at least one holding tool, the holding tool(s) comprising a crown made of compressible material and a concentric disk, the crown comprising a first surface in contact with the periphery of the disk and a second surface opposite the first surface in contact with an internal face of the preform, sintering the fibrous preform comprising the matrix precursor particles in order to form a matrix in the porosities of said fibrous preform to obtain a composite material part, the majority of the compressible material of the crown being decomposed by oxidation at the end of the sintering step, removing the holding tool(s) from the composite material part obtained.

According to one embodiment of the invention, the compressible material is expanded graphite.

According to another embodiment of the invention, the step of impregnating the fibrous preform also comprises the impregnation of said preform with a binder, the method further comprising a step of debinding the fibrous preform of revolution disposed around the holding tool before the sintering step.

According to another embodiment of the invention, a positioning and centering device is used during the step of placing the fiber preform around the holding tool(s), the positioning device comprising at least one rod and one support, the end of the fiber preform along its axis of revolution furthest from the portion of the fiber preform in contact with the holding tool resting on the support, said support being fixed to the rod and the holding tool(s) being fixed to the rod by their center during the placement step.

The use of such a positioning device makes it easier to mount the holding tool(s) in the fiber preform and ensures satisfactory centering, while limiting the risk of damaging said preform during this mounting operation.

BRIEF DESCRIPTION OF THE DRAWINGS

FIG. 1 is a schematic perspective view of a fibrous preform of revolution.

FIG. 2 is a schematic sectional view of an impregnation tool in which the preform of FIG. 1 is disposed.

FIG. 3 is a schematic exploded perspective view of a holding tool mounted in the impregnated fiber preform of FIGS. 1 and 2.

FIG. 4 is a schematic sectional view of a device for positioning the holding tool of FIG. 3 in the fiber preform.

FIG. 5 is a schematic sectional view of a sintering installation according to the invention comprising the impregnated fibrous preform held by the holding tool of FIG. 3.

FIG. 6 is a schematic sectional view of the installation of FIG. 5 comprising a composite material part obtained by sintering the impregnated fiber preform.

DESCRIPTION OF THE EMBODIMENTS

The method for manufacturing a part made of thermostructural composite material, preferably of the oxide/oxide type, in accordance with the present invention begins with the production of a fibrous preform intended to form the fibrous reinforcement of the part.

An example of a fiber preform 10 is illustrated in FIG. 1. The preform 10 has a shape of revolution with an axis of revolution X. Thus, the preform 10 comprises an external face 10*a* and an internal face 10*b*. The fiber preform 10 may in particular have a cylindrical shape, a truncated cone shape, a bulb shape or else a combination of these shapes. The fiber preform 10 may have a maximum cross-section with a diameter greater than 700 mm.

The fiber preform 10 can thus be produced at least in part by stacking plies or folds obtained by two-dimensional (2D) weaving. The fiber preform 10 can also be produced at least in part by stacking plies or folds obtained by three-dimensional (3D) weaving. "Two-dimensional weaving" means here a conventional weaving method by which each weft thread passes from one side to the other of threads of a single warp layer or vice versa. "Three-dimensional weaving" means here a weaving by which warp threads pass through several layers of weft threads, or weft threads pass through several layers of warp threads. The preform 10 can also be produced at least in part by sheets of unidirectional (UD) fibers.

The fiber preform 10 can be obtained by laying ribbons or by automated fiber placement (AFP), by draping, or by filament winding.

Finally, the preform 10 can be obtained at least in part by braiding or knitting.

The fibrous preform 10 may be formed from fibers made of one of the following materials: alumina, mullite, silica, an aluminosilicate, a borosilicate, silicon carbide, carbon, or a mixture of several of these materials.

When the fibrous preform 10 is produced, it is impregnated with one or more matrix precursors. Preferably, the fibrous preform 10 is impregnated with a slip. The impregnation of the fibrous preform 10 with a slip can be carried out by placing said preform 10 in a mold closed by a rigid counter-mold, the mold and the counter-mold defining an internal volume having the shape of the part to be manufactured. The impregnation of the fibrous preform 10 can also be carried out under a flexible membrane, as illustrated in FIG. 2. The impregnation of the fibrous preform 10 under a flexible membrane is, in a well-known manner, particularly suitable for the manufacture of parts of slender shape and low thickness, in particular by allowing better control of the dimensions of the part.

In the example illustrated in FIG. 2, the fibrous preform 10 is disposed in an impregnation tool 500. Said impregnation tool 500 comprises a mold, which includes on the one hand an impregnation chamber 501 in which a fibrous preform 10 is disposed and on the other hand a compaction chamber 502.

A slip 5 comprises a liquid phase in which particles 51 of a matrix precursor are dispersed. More particularly, the slip may correspond to a suspension containing a liquid phase and a powder of matrix precursor particles. The liquid phase may in particular consist of water, ethanol or any other liquid in which it is possible to suspend the desired powder. The pH of the liquid phase of the slip can be adapted according to the nature of the particles, for example water with an acid pH in the case of an alumina powder.

An organic binder can also be added (water-soluble PVP or PVA for example). This binder ensures the consistency of the raw material, possibly after drying and before debinding and sintering.

The slip may for example correspond to an aqueous suspension consisting of alumina powder whose average particle size (D50) is comprised between 0.1 μm and 1 μm and whose volume fraction is comprised between 5% and 50%, the suspension being acidified by nitric acid (pH comprised between 1.5 and 4). In addition to alumina, the refractory oxide particles may also be made of a material selected from mullite, silica, an aluminosilicate, an aluminophosphate, zirconia, a carbide, a boride, a nitride and carbon. Depending on their basic composition, the refractory oxide particles can be further mixed with particles of alumina, zirconia, aluminosilicate, rare earth oxides, rare earth disilicates (used for example in environmental or thermal barriers) or any other filler allowing specific functions to be added to the final material (carbon black, graphite, silicon carbide, etc.).

The slip 5 is intended to be injected into the impregnation chamber 501 and a compression fluid 6 is intended to be injected into the compaction chamber 502. Thus, the impregnation chamber 501 includes one or more inlet orifices 511 allowing the introduction of the slip 5 into said impregnation chamber 501. The inlet orifice(s) 511 of the impregnation chamber 501 may be equipped with a valve. The impregnation chamber 501 may also include one or more outlet orifices 512 allowing the liquid phase of the slip 5 to be evacuated. Similarly, the compaction chamber 502 includes one or more inlet orifices 521 allowing the compression fluid 6 to be introduced into said compaction chamber 502, and one or more outlet orifices 521 allowing the compression fluid 6 present in said compaction chamber 502 to be sucked in and evacuated. The inlet and outlet orifices 521 of the compaction chamber 502 may be the same, or at least partly the same, as in the example illustrated in FIG. 2. The inlet orifice(s) 521 of the compaction chamber 502 may be equipped with a valve.

The compression fluid 6 can for example be water or oil.

The impregnation chamber 501 may include a filtration stratum 540 interposed between the fibrous preform 10 and the outlet orifice(s) 512 of the impregnation chamber 501. The filtration stratum 540 allows to retain the matrix precursor particles 51 of the slip 5 in the preform 10 while allowing the liquid phase of the slip 5 to pass, the liquid phase of the slip 5 being evacuated via the outlet orifice(s) 512 of the impregnation chamber 501.

The filtration stratum 540 comprises a first face 540a and a second face 540b, opposite the first face 540a. Preferably, the internal face 10b of the preform 10 rests on the second face 540b of the filtration stratum 540. Thus, the second face 540b of the filtration stratum 540 has a shape adapted to the shape of the internal face 10b of the preform 10b. Preferably, the filtration stratum 540 is therefore a volume of revolution with an axis of revolution X.

The filtration stratum 540 may for example be made of microporous polytetrafluoroethylene (PTFE) but also of plaster or paper. To produce the filtration stratum 540, it is possible for example to use a material having a pore size comprised between 1 µm and 5 µm. The filtration stratum 540 may have a resulting permeability comprised between $10^{-14}$ m$^2$ and $10^{-15}$ m$^2$.

A rigid perforated element (not shown) may be interposed between the filtration stratum 540 and the outlet orifice(s) 512 of the impregnation chamber 501. Such a rigid perforated element is described in particular in document US 20190134848 A1. The function of this rigid perforated element is to facilitate the evacuation of the liquid phase having passed through the filtration stratum 540 via the outlet orifice(s) 512, regardless of its outlet point at the first face 540a of the filtration stratum 540. To further facilitate the evacuation of the liquid phase of the slip 5, the rigid perforated element may include cutouts or cavities between its openings.

A distribution element (not shown) may optionally be disposed between the filtration stratum 540 and the rigid perforated element if applicable, said distribution element having a permeability greater than that of the filtration stratum 540. Such a distribution element allows to obtain a more uniform flow rate of the liquid phase inside the filtration stratum 540.

The impregnation chamber 501 and the compaction chamber 502 of the mold are separated by a flexible membrane 530. The flexible membrane 530 is placed facing the external face 10a of the preform 10. The membrane 530 comprises a first surface 530a and a second surface 530b opposite the first surface 530a. The first surface 530a of the membrane 530 is placed facing the preform 10. The first surface 530a of the membrane 530 is present on the side of the impregnation chamber 501, and the second surface 530b of the membrane 530 is present on the side of the compaction chamber 502.

The membrane 530 can allow to apply pressure to the slip 5 present in the impregnation chamber 501 in order to cause said slip 5 to penetrate into the fibrous preform 10. The membrane 530 can also allow to apply a compacting pressure to the fibrous preform 10 disposed in the impregnation chamber 501. The pressure applied by the membrane 530 is produced by the compression fluid 6 which, by applying pressure to the membrane 530, deforms the membrane 530 against the fibrous preform 10. The pressure applied by the compression fluid 6 to the membrane 530 can also allow to hold said membrane 530 in place against the fibrous preform 10 if the pressure increases in the impregnation chamber 501. Thus, the first surface 530a of the membrane 530 can be intended to be in contact with the fibrous preform 10 when the compaction chamber 502 is filled with the compression fluid 6.

The membrane 530 is for example made of silicone, or for example of a rubber-type material. The membrane 530 can be reinforced with glass or polyester fibers. The membrane 530 must be made of a material resistant to the temperatures to which said membrane 530 may be subjected during the complete process, as well as to the fluids with which the membrane 530 will be in contact. The membrane 530 must have a compressibility consistent with the dimensional tolerance sought for the part.

The impregnation of the fibrous preform 10 can be carried out by first injecting the slip 5 into the impregnation chamber 501, then by injecting the compression fluid 6 into the compaction chamber 502. The compression fluid 6 applies pressure to the slip 5 through the membrane 530. The compression fluid 6 imposes pressure on the entire membrane 530 and, consequently, on the entire slip 5 present above the preform 10.

The pressure applied by the membrane 530 to the slip 5 and to the fibrous preform 10 is preferably reduced, so as to cause the slip 5 to penetrate into the preform 10 and sufficiently compact said preform 10 to allow the liquid phase of the slip 5 to be drained by the filtration stratum 540 without degrading the fibrous preform 10. In combination with the application of pressure to the slip by the compression fluid 6, pumping, for example by means of a primary vacuum pump (not shown in FIG. 2), can be carried out at the outlet orifice(s) 512 of the impregnation chamber 501. This pumping is optional. In addition, the impregnation tool 500 may be provided with heating means, such as resistive elements integrated into the walls, in order to increase the temperature in the compaction chamber 502 and to facilitate the evacuation of the liquid phase of the slip by evaporation. The filtration stratum 540 allows to retain the matrix precursor particles 51 present in the slip 5 inside the porosities of the preform 10, said particles 51 thus gradually being deposited in the fibrous preform 10. These particles 51 allow to form the matrix after sintering.

According to a variant, the impregnation of the fibrous texture 10 can be carried out by first injecting the compression fluid 6, then the slip 5, for example according to the method described in document US 2021046671 A1. The injections of the compression fluid 6 and the slip 5 can also be carried out simultaneously, or at least partly simultaneously. Furthermore, the injection of the slip can be completed before completing the injection of the compression fluid, or the injection of the compression fluid can be completed before completing the injection of the slip.

The impregnation of the fibrous preform 10 can also be carried out with several slips. The impregnation of the fibrous preform 10 can also be carried out using infusion-type techniques, injection molding techniques known as "RTM" or submicron powder suction techniques known as "APS".

When the fibrous preform 10 is suitably impregnated, it can be removed from the impregnation tool 500. The impregnated fibrous preform 10 can be removed from the impregnation tool 500 after a drying phase, preferably at a temperature greater than 60° C. and less than 90° C., which allows to evacuate the remainder of the liquid phase still present. Thus, the porosities of the fibrous preform 10 are partially filled by the matrix precursor particles 51, as illustrated in FIG. 3.

The fibrous preform can also be made from pre-impregnated layers or plies as described above. Thus, the fibrous preform can for example be made in a well-known manner by draping layers or plies obtained by two-dimensional or three-dimensional weaving pre-impregnated with a slip as described above, or by automated placement of pre-impregnated fibers or fibrous textures. Such a fibrous preform is then placed in an autoclave, then demolded to be ready for sintering.

Before proceeding with the sintering, and if necessary the debinding, of the fibrous preform 10 comprising the matrix precursor particles 51, said fibrous preform 10 is disposed around at least one holding tool 100, as illustrated in FIG. 3.

Each holding tool 100 comprises at least one disk 110 and a crown 120. The disk 110 and the crown 120 are concentric. The disk 110 comprises two opposite circular faces 110a and 110b and a lateral face 110c, said lateral face 110c connecting the upper circular face 110a to the lower circular face 110b. The lateral face 110c of the disk 110 may have a geometry adapted to the portion of the internal face 10b with which the tool 100 is in contact. Thus, the lateral face 110c of the disk 110 may be cylindrical or frustoconical.

When the holding tool 100 is disposed in the fiber preform 10, the axis of revolution of the general shape of the disk 110 may coincide with the axis of revolution X of the preform 10. More generally, when the holding tool 100 is disposed in the fiber preform 10, the axis of revolution of the general shape of the holding tool 100 may coincide with the axis of revolution X of the preform 10. Thus, preferably, the holding tool 100 extends perpendicular to the axis of revolution X of the preform 10 when it is deposited inside said preform 10.

Preferably, the holding tool(s) 100 are disposed at one end of the fiber preform 10 along the axis of revolution X. In particular, a holding tool 100 is preferably disposed at the end of the largest radius of the fiber preform 10 along the axis of revolution X. Indeed, the ends of the preform 10 along its axis of revolution X are more fragile and more sensitive to deformations, in particular when they have a large radius: it is therefore more judicious to place the holding tool(s) in these sensitive portions of the preform 10.

The disk 110 may comprise one or more through-orifices 111 and 112. Thus, said through-orifices 112 open on the one hand onto the upper circular face 110a of the disk 110, and on the other hand onto the lower circular face 110b of said disk 110. Said through-orifices 111 and 112 may serve as a grip or attachment zone to facilitate handling of the tool 100. The disk 110 may comprise a through-orifice 111 centered on the axis of revolution of the disk 110, that is to say centered on the axis of revolution of the lateral face 110c of the disk 110. Thus, the axis of revolution of said through-orifice 111 coincides with the axis of revolution of the disk 110, that is to say coincides with the axis of revolution of the lateral face 110c of the disk 110. The disk 110 may then have an annular shape. The through-orifices 111 and 112 also allow to lighten the disk 110. The through-orifice(s) 112 of the disk 110 not comprising the axis of revolution of the disk 110 are preferably disposed angularly in a regular manner around the axis of the disk 110, as illustrated in FIG. 3. The through-orifice(s) 112 of the disk 110 not comprising the axis of revolution of the disk 110 are preferably of identical size and their axes are located at an identical distance from the axis of the disk 110. Such regularity of placement and dimensioning of the through-orifices of the disk 110 allows to maintain a regular thermal expansion of the disk 110 in the radial direction. The through-orifice(s) 112 of the disk 110 not comprising the axis of revolution of the disk 110 may have a diameter greater than 50 mm.

The crown 120 comprises a first face 120a disposed in contact with the lateral face of the disk 110. Thus, the crown 120 comprises a first face 120a disposed in contact with the periphery of the disk 110. The crown 120 also comprises a second face 120b, opposite the first face 120a of said crown 120, intended to be in contact with the fibrous preform 10 comprising the particles 51. More precisely, the second face 120b of the crown 120 is intended to be in contact with a reduced portion of the internal face 10b of the preform 10 comprising the particles 51. When the holding tool is mounted in the fibrous preform 10, the crown 120 comprises the first surface 120a in contact with the periphery of the disk 110 and the second surface 120b opposite the first surface 120a in contact with a portion of the internal face 10b of the preform 10. Thus, the second face 120b of the crown 120 has a geometry adapted to the portion of the internal face 10b with which said second face 120b is in contact. Thus, the second face 120b of the crown 120 can for example be cylindrical or frustoconical.

Preferably, the disk 110 is made of monolithic ceramic. Monolithic ceramic is understood to mean a ceramic without fibrous reinforcement, the porosity of which can be comprised between 0% and 81%, and preferably between 10% and 40%.

The more porous the monolithic ceramic, the easier, lighter and more inexpensive the disk 110 is to machine.

The disk 110 may be made of mullite. If the disk 110 is made of mullite, it may comprise 60% to 80% alumina, and preferably 65% to 70% alumina. Indeed, a disk 110 made of mullite with such percentages of alumina allows reduced thermal expansion of said disk 110, and therefore reduced compression of the crown 120, while ensuring contact between the holding tool 100 and the preform 110 up to high temperatures, and in particular up to temperatures higher than the sintering start temperature. Mullite also has the advantage of being inexpensive.

The disk 110 is preferably made of alumina. Indeed, a disk 110 made of alumina has a coefficient of thermal expansion almost identical to the coefficient of the preform to be held, which allows to limit the thickness of the crown 120.

The disk 110 may also be made of a ceramic matrix composite material of the CMC type, for example of the C/SiC or SiC/SiC type. In particular, if the part to be manufactured is a part made of a composite material of the C/SiC type, a disk made of a composite material of the C/SiC type may be selected, and if the part to be manufactured is a part made of a composite material of the SiC/SiC type, a disk made of a composite material of the SiC/SiC type may be selected.

Preferably, the coefficient of thermal expansion of the material of the disk 110 is close to the coefficient of thermal expansion of the fiber preform 10. Thus, preferably, the value of the coefficient of linear thermal expansion in the radial direction of the material of the disk 110 is comprised between 90% and 110% of the value of the coefficient of thermal expansion in the radial direction of the material of the preform 10. In particular, the coefficient of linear thermal expansion of the material of the disk 110 may be comprised between $5 \times 10^{-6}$ K$^{-1}$ and $8 \times 10^{-6}$ K$^{-1}$, and preferably between $6 \times 10^{-6}$ K$^{-1}$ and $7.5 \times 10^{-6}$ K$^{-1}$. Indeed, such values promote reduced expansion of the material of the disk 110 in order to limit the compression of the crown 120 against the preform 10 while ensuring contact between the holding tool 100 and the preform 110 up to high temperatures, and in particular up to temperatures above the sintering start temperature.

The material of the crown 120 is a compressible material, that is to say a material capable of compressing by at least 20% when the disk 110 expands and presses said compressible material against the internal face 10b of the fiber preform 10. Preferably, the compressible material of the crown 120 is capable of compressing by at least 30% when the disk 110 expands and presses said compressible material against the internal face 10b of the fiber preform 10.

Thus, the crown 120 is preferably made of expanded graphite, which is for example in the form of flexible graphite sheets. The expanded graphite also has the advantage of being able to be easily wound around the disk 110. The crown 120 can also be made of felt, for example carbon.

The crown 120 mounted between the disk 110 and the internal face 10b of the preform 10 as described above may have a thickness in the radial direction comprised between 2 mm and 15 mm depending on the thermal expansion of said disk 110 and said preform 10. The thickness of the crown 120 is determined in a well-known manner by calculations of the thermal expansion of the preform 10, the crown 120 and the disk 110, so as to ensure contact between said crown 120 and the internal face 10b of the preform 10 at least until the start of the sintering step. In particular, if the disk 110 is made of mullite, the crown 120 may have a thickness in the radial direction comprised between 5 mm and 15 mm depending on the thermal expansion of said disk 110 and said preform 10. If the disk 110 is made of alumina, the crown 120 may have a thickness in the radial direction comprised between 2 mm and 12 mm depending on the thermal expansion of said disk 110 and said preform 10.

Preferably, the compressible material of the crown 120 is capable of decomposing by oxidation in an oxidizing atmosphere and at high temperature. In particular, the compressible material of the crown 120 may be configured to be mostly decomposed by oxidation during a sintering step in air. In particular, the compressible material of the crown 120 may be configured to be mostly decomposed by oxidation from a temperature value comprised between 600° C. and 1200° C. Furthermore, the compressible material of the crown 120 may be configured to be mostly unaltered by oxidation during a debinding step. In particular, the compressible material of the crown 120 may be configured to be mostly unaltered by oxidation up to 400° C., and preferably up to 600° C. A compressible material made of expanded graphite may meet such properties. Under an inert atmosphere, as is the case during a pyrolysis operation or during a chemical infiltration operation in the gas phase, expanded graphite does not oxidize. Under an atmosphere very low in oxygen, expanded graphite has a very slow oxidation kinetics up to the sintering temperature.

Preferably, the materials of the disk 110 and the crown 120 are selected so that the crown 120 is very little compressed at room temperature, when the holding tool 100 is placed on the internal face 10b of the preform 10, and is very little compressed during the possible debinding of said preform 10. Thus, the tool 100 applies a very low pressure on the preform 10 at the time of its placement, in order to limit the risk of damage to said preform 10, and applies a very low pressure on the preform 10 at the time of its possible debinding, when said preform 10 has a weak strength and consequently an increased risk of deformation.

Several holding tools 100 as described above can be disposed in the fiber preform 10, provided that their placement in said preform 10 is possible while taking into account the variations in section of said preform.

In order to facilitate the positioning of the holding tool 100 inside the preform 10 and to avoid damaging said preform, an additional positioning device 200 may be used, as illustrated in FIG. 4. This additional positioning device 200 allows in particular to ensure good centering between the holding tool 100 and the fiber preform 10.

In the example illustrated in FIG. 4, the additional positioning device 200 comprises a rod 220 and a foot 250 intended to support the mass of the positioning device 200 when the latter is mounted with the fiber preform 10 and the holding tool 100. The foot 250 comprises an orifice or a bore 251 allowing the fixing of the rod 220. The rod 220 is preferably threaded. If the rod 220 is threaded, the bore 251 of the foot 250 is preferably threaded.

The positioning device 200 may further comprise a support 240 including a central through-orifice or bore 241, which may or may not be threaded. Thus, the support 240 of the device 200 is capable of being fixed to the rod 220, said rod 220 passing through the support 240 via the central bore 241. The support 240 is preferably maintained at a non-zero distance from the foot 250, for example by means of nuts. The support 240 is intended to accommodate and be in contact with one end of the fiber preform 10 along its axis of revolution X. Preferably, the support 240 is intended to accommodate the end of the fiber preform 10 along its axis of revolution X furthest from the portion of the fiber preform 10 that accommodates the holding tool 100, in order to facilitate the assembly of the positioning device 200, the holding tool 100 and the preform 10. Preferably, the support 240 is intended to accommodate the end of the fiber preform 10 along its axis of revolution X having the smallest radius. The support 240 can be in contact with the external face 10a of the fiber preform 10. The support 240 can be produced by additive manufacturing, in order to obtain a support 240 shape that is as suitable as possible for the end of the preform 10 in contact with the support 240 when said preform 10 is mounted with the positioning device 200.

Preferably, one of the through-orifices 111 of the disk 110 allows the passage of the rod 220 of the positioning device 200. Said through-orifice 111 allowing the passage of the rod 220 can be threaded. The axis of this through-orifice 111 is preferably coincident with the axis of the disk 110.

The positioning device 200 may further comprise at least one platen 230 including a central through-orifice or bore 231, which may or may not be threaded. Thus, the platen 230 of the device 200 is capable of being fixed to the rod 220, said rod 220 passing through the platen 230 via the bore 231. The platen 230 may be intended to fix a holding tool 100 to the rod 220 of the positioning device 200, or to hold a holding tool 100 during positioning. For this purpose, the platen 230 comprises an assembly face 232 intended to be in contact with the upper circular face 110a of the disk 110 of a holding tool 100. Thus, preferably, the positioning device 200 comprises a platen 230 for each holding tool 100.

The through-orifice(s) 112 of the disk 110 distinct from the orifice 111 allowing the passage of the rod 220 can facilitate assembly with the positioning device 200, by allowing access to the platen 230 or to the nuts. Thus, preferably, the through-orifice(s) 112 of the disk 110 distinct from the orifice 111 are of sufficient size to allow the passage of a hand or a suitable tightening tool.

The positioning device 200 may also comprise a plate 210 including a central orifice or bore 211, which may or may not be threaded. The central orifice 211 is configured to allow the rod 220 to pass through. The plate 210 is in particular fixed to the rod 220 by means of nuts, as illustrated in FIG. 4. The plate 210 comprises an assembly face 213 intended to be at least partly in contact with the end of the fiber preform 10 opposite the support 240. Preferably, the assembly face 213 of the plate 110 is also intended to be in contact with the lower circular face 110b of the disk 110 of a holding tool 100. Preferably, the plate 210 of the positioning device 200 comprises one or more through-orifices 212. The through-orifice(s) 212 are disposed such that, when the fiber preform 10 is mounted with the positioning device 200, the through-orifice(s) 212 of the plate 210 are disposed in the extension of the through-orifice(s) 112 of the holding tool 100.

When the preform 10, the holding tool 100 and the positioning device 200 are mounted together, the platen(s) 230 are present between the support 240 and the plate 210, and each holding tool 100 is present between at least one platen 230 and the plate 210, as illustrated in FIG. 4.

When the holding tool(s) 100 have been properly mounted in the fiber preform 10 by means of the positioning device 200, the assembled assembly comprising the positioning device 200, the holding tool 100 and the fiber preform 10 can be turned over. The positioning device 200 allows to turn over the fiber preform 10 without handling it directly, which is advantageous since the latter is not yet sintered, and therefore fragile and sensitive to deformation. When the turning is complete, the fiber preform 10 is then preferably supported by the plate 210. When the turning is complete, the positioning device 200 can be removed completely or partially. Preferably, when the turning is complete, the plate 210 is left in contact with the preform 10 and the remainder of the positioning device 200 is removed, and in particular the rod 220, the platen(s) 230, the support 240 and the foot 250 if used are removed.

Preferably, the plate 210 comprises one or more through-orifices 212 distinct from the central through-orifice 211 allowing the passage of the rod 220. When the assembly face of the plate 210 is in contact with a holding tool 100, at least a portion of the through-orifice(s) 212 of the plate 210 are located in the extension of at least a portion of the through-orifice(s) 112 of the holding tool 100. Indeed, the plate 210 can be kept as a support for the preform 10 during the sintering and, where appropriate, debinding operations. Such through-orifices 212 on the plate 210 are thus capable of allowing the burnt gases to pass during sintering or any imperfections that need to be evacuated during sintering or debinding. The material of the plate 210 may then have properties compatible with a sintering or debinding step, for example by having chemical inertness and thermal expansion suitable for such methods. The plate 210 may possibly have undergone prior treatment in order to stabilize its material and avoid interference with the sintering step.

The fiber preform 10 held by the holding tool(s) 100 is then disposed in a sintering furnace 300, as illustrated in FIG. 5. As explained above, the fiber preform 10 preferably rests on the plate 210 in the sintering furnace. The sintering furnace 300 comprises at least one chamber 310 in which the fiber preform 10 held by the holding tool(s) 100 is disposed, resting or not on the plate 210 of the positioning device 200. The sintering furnace 300 comprises heating devices 320. The sintering furnace 300 may be a gas furnace operating at atmospheric pressure, the furnace being heated by one or more gas burners. The gases produced by the burners, after having heated the furnace, are extracted by an extractor in order to leave room for the gases formed continuously by the combustion.

The sintering furnace 300 may optionally comprise one or more gas inlet orifices 311 opening into the chamber 310 and one or more gas outlet orifices 312 from the chamber 310, as illustrated in FIGS. 5 and 6. The gas inlet orifice(s) and the gas outlet orifice(s) may be at least partly coincident.

The atmosphere in the chamber 310 of the sintering furnace 300 conventionally comprises oxygen, which allows to obtain a decomposition of the compressible material of the crown 120 by oxidation. However, preferably, the oxygen content of the atmosphere of the chamber 310 of the sintering furnace 300 is limited, in order to limit the oxidation kinetics of the compression material of the crown 120 and not to prematurely oxidize said compressible material of the crown 120, and in particular in order not to oxidize the majority of the compressible material of the crown 120 before the start of sintering of the matrix precursor particles in the preform 10.

The temperature increase in the sintering furnace 300 receiving the fiber preform 10 can be done gradually.

If the fibrous preform 10 comprises a binder, the temperature increase of the sintering furnace 300 allows to debind the preform, before reaching the temperatures allowing the sintering of said preform 10. The temperature of the chamber 310 of the furnace 300 is for example comprised between 200° C. and 450° C. during the debinding of the fibrous preform 10.

The temperature of the chamber 310 of the furnace 300 further increases until reaching the temperatures allowing the sintering of the preform 10. The temperature of the chamber 310 of the furnace 300 is for example comprised between 1000° C. and 1200° C. during the sintering of the fibrous preform 10, and in particular during the sintering of the matrix precursor particles present in the fibrous preform 10. The sintering step allows to form a matrix in the porosities of the preform 10, so as to obtain a part 1 made of composite material as illustrated in FIG. 6. The part 1 made of composite material comprises an external face 1a, having a geometry substantially identical to the geometry of the external face 10a of the preform 10, and an internal face 1b, having a geometry substantially identical to the geometry of the internal face 10b of the preform 10.

After debinding, the debinded fibrous preform 10 is particularly fragile and sensitive to deformations. It is therefore important that the compressible material of the crown 120 is preserved during the debinding of the preform 10, and preferably at least until the start of sintering of said preform 10. Indeed, when sintering begins, the matrix precursor particles present in the porosities of the preform are sintered and the matrix begins to form in said porosities of the preform, improving its strength and hold. Thus, preferably, the oxidation of the compressible material of the crown 120 must be very limited during debinding, relatively low until the start of the sintering operation and significant during the sintering operation. Preferably, when the sintering operation is completed as illustrated in FIG. 6, the majority of the compressible material of the crown 120 has disappeared to facilitate the removal of the holding tool(s) 100 from the composite material part 1, and to avoid the risk of contact between the disk 110 and the internal face 1b of the composite material part 1 during its cooling. In particular, in the atmospheric conditions of the sintering furnace 300, the compressible material can begin to decompose by oxidation from 400° C. with very slow kinetics, then can decompose by oxidation with faster kinetics from a temperature comprised between 600° C. and 700° C., and finally with very fast kinetics from 900° C. A compressible material having such properties can for example be expanded graphite, as described above.

The contact between the holding tool 100 and the internal face 10b of the preform 10 can also be maintained throughout the entire sintering step.

Preferably, the compressible material is selected so as not to alter the fibrous preform 10 or the chamber 310 of the oven 300 during its decomposition.

The debinding step can be carried out in an installation different from the sintering installation, the load comprising the fibrous preform and the holding tool(s) being transported at the end of the debinding step in a sintering installation according to the invention.

The sintering step thus allows to form the matrix in the porosities of the fiber preform 10, in order to obtain the desired composite material part. The installation and the method of the invention are particularly suitable for producing parts intended to constitute all or part of aeronautical engine rear-body parts, or all or part of combustion chambers. Generally speaking, the composite material revolution part may have a maximum cross-section of diameter greater than 700 mm.

The expression "comprised between . . . and . . . " must be understood as including the limits.

The invention claimed is:

1. An installation for sintering a revolution preform comprising a sintering furnace wherein a load is disposed, wherein the load comprises a revolution preform disposed around at least one holding tool, the at least one holding tool comprising a disk and a crown present on a periphery of the disk, the crown being made of compressible material capable of being eliminated by thermal oxidation, a portion of the preform being in contact with the crown before sintering.

2. The installation according to claim 1, wherein the compressible material is expanded graphite.

3. The installation according to claim 1, wherein the disk is made of monolithic ceramic.

4. The installation according to claim 1, wherein the at least one holding tool is disposed at one end of the preform along its axis of revolution.

5. The installation according to claim 1, wherein the revolution preform comprises matrix precursor particles in its porosities.

6. A method for manufacturing a composite material revolution part comprising:
   impregnating a fibrous preform of revolution at least by particles of one or more matrix precursors,
   placing the fibrous preform of revolution comprising the matrix precursor particles around at least one holding tool, the at least one holding tool comprising a disk and a crown present on a periphery of the disk, the crown being made of compressible material capable of being eliminated by thermal oxidation, a portion of the preform being in contact with the crown,
   sintering the fibrous preform comprising the matrix precursor particles in order to form a matrix in the porosities of said fibrous preform to obtain a composite material part, the majority of the compressible material of the crown being decomposed by oxidation at the end of the sintering,
   removing the at least one holding tool from the composite material part obtained.

7. The method according to claim 6, wherein the compressible material is expanded graphite.

8. The method according to claim 6, wherein the impregnating of the fibrous preform also comprises the impregnation of said preform with a binder, the method further comprising debinding the fibrous preform of revolution disposed around the holding tool before the sintering.

9. The method according to claim 6, wherein a positioning and centering device is used during the placing the fiber preform around the at least one holding tool, the positioning device comprising at least one rod and one support, an end of the fiber preform along its axis of revolution furthest from the portion of the fiber preform in contact with the holding tool resting on the support, said support being fixed to the rod and the at least one holding tool being fixed to the rod by their center during the placement step.

* * * * *